(12) United States Patent
Kopp et al.

(10) Patent No.: US 6,602,611 B1
(45) Date of Patent: Aug. 5, 2003

(54) BONDED MULTI-LAYER COMPOSITE PLATES AND A METHOD FOR PRODUCING MULTI-LAYER COMPOSITE PLATES

(75) Inventors: Reiner Kopp, Anachen (DE); Arndt Gerick, Ulm (DE); Klaus Lempe-Nauer, Ulm (DE); Peter Winkler, Ottobrunn (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/786,301

(22) PCT Filed: Aug. 31, 1999

(86) PCT No.: PCT/DE99/02714

§ 371 (c)(1),
(2), (4) Date: Apr. 23, 2001

(87) PCT Pub. No.: WO00/13890

PCT Pub. Date: Mar. 16, 2000

(30) Foreign Application Priority Data

Sep. 2, 1998 (DE) .......................................... 198 39 931

(51) Int. Cl.⁷ ...................... B60R 13/08; G10K 11/168; B32B 15/08; B32B 3/24
(52) U.S. Cl. ...................... 428/596; 428/626; 428/608; 428/71; 29/897.2; 29/897.32; 156/326
(58) Field of Search ................................. 428/593, 596, 428/608, 624, 626, 71; 29/897.32, 897.2; 156/222, 197, 326

(56) References Cited

U.S. PATENT DOCUMENTS

| | | | |
|---|---|---|---|
| 3,144,370 A | * 8/1964 | Bennett et al. ........... 156/89.28 |
| 3,249,659 A | * 5/1966 | Voelker ........................ 156/179 |
| 3,430,405 A | * 3/1969 | Alder et al. ................. 165/135 |
| 3,764,277 A | * 10/1973 | Hollis ......................... 220/646 |
| 3,970,324 A | * 7/1976 | Howat ........................ 156/197 |
| 4,259,385 A | * 3/1981 | Keller .......................... 428/116 |
| 4,759,994 A | * 7/1988 | Lesourd ....................... 138/143 |

FOREIGN PATENT DOCUMENTS

| | | | |
|---|---|---|---|
| DE | 3723924 | * | 3/1988 |
| DE | 4239884 | * | 6/1994 |
| DE | 3935120 | * | 3/1997 |
| JP | 07-251688 | * | 10/1995 |
| JP | 10-266406 | * | 10/1998 |

* cited by examiner

*Primary Examiner*—John J. Zimmerman
(74) *Attorney, Agent, or Firm*—Pendorf & Cutliff

(57) ABSTRACT

The invention relates to a multi-layer composite plates and to a method for producing multi-layer composite plates. Said multi-layer composite plates are comprised of two outer metallic slabs which serve as top and base plates and which are joined to a deformable connecting material located therebetween. The top and base plates are joined to the connecting material by means of a foaming adhesive which fills the cavities remaining in the composite. The cavities remaining in the composite are completely or partially filled by the adhesive. According to the method for producing multi-layer composite plates, adhesive is introduced between the layers to be joined, and the adhesive is subjected to a thermal treatment. The adhesive is completely or partially hardened during the thermal treatment. In the case of the partially hardened adhesive, the adhesive is completely hardened during an additional thermal treatment only after the multi-layer composite plate is reshaped.

12 Claims, 2 Drawing Sheets

A

B

A

B

BONDED MULTI-LAYER COMPOSITE PLATES AND A METHOD FOR PRODUCING MULTI-LAYER COMPOSITE PLATES

BACKGROUND OF THE INVENTION

The invention concerns multi-layer composite plates, and a process for producing multi-layer composite plates.

DESCRIPTION OF THE RELATED ART

Multi-layer composite plates and process for production of multi-layer composite plates are broadly employed in lightweight construction materials.

Above all in the field of transportation, specific lightweight materials, such as aluminum or fiber reinforced composite materials, or even high strength automobile body steel, are preferably employed. However, while it may be possible to satisfy the strength requirements when employing materials of increasing strength and increasingly thinner sheet thicknesses, it is not possible therewith to satisfy the stiffness requirements. Lightweight materials encounter limitations above all there, where for geometric reasons the reduced cross-section is no longer sufficient to satisfy the requirements for the construction material stiffness. One solution is offered by geometric stiffening along with low surface area weight, the so called high specific stiffness. This type of multi-layer composite is already known in many variations such as web plate, dimpled, and trapezoid or pitch composite plates, in which geometry is produced by deforming or bending with internally supporting intermediate materials offering the basis for the technological solution in lightweight materials. As suitable intermediate materials, mentioned may be made of foam core fillers with polymeric foams or even metallic foams and even diatomaceous earth fillers.

Preferred industrially today is above all a three-layer material composite comprised of two steel sheets and an intermediate layer of visco-elastic material. This type of composite sheet material is employed on the basis of its relatively thin intermediate layer, which partly contributes towards increasing stiffness, but mainly contributes value by virtue of its oscillation dampening characteristics.

Besides this, there is known from DE 39 35 120 C2 a process for production of multi-layer composite plates, which are comprised of a top and a base plate and sandwiched in between is a cross-over material of wire, which is welded or adhered at the wire contact points of the mesh. Even though in certain cases, during the production process the intermediate layer, the lattice or mesh contact points or "knots" are rolled flat, whereby a greater contact surface is offered to the top and base plates, nevertheless in particular the contact points far from the neutral plane can however be subjected to strong thrust forces and thereby rip. As soon as, during the deformation process, connecting points damaged in this way drift apart from each other even minimally, these are not subsequently reattached, even when using surface contacting adhesives in subsequent process steps. As a general rule, it can be said that with respect to deformability, the higher the so-called weight specific stiffness of a structure is, the narrower are the limits, out of which a planar composite structure can be deformed into a curved construction component. This applies in principle also for lattice and expanded metal composites, wherein due to the compressing of the intermediate material during deformation, the punching-through of the intermediate layer structure on the traverse sheets and even a ripping open of the cover sheets limits the degree of deformability.

In the more complex structures described in terms of the manufacturing process in document EP 0 636 517 B1, the individual layers and intermediate filler layers are joined into multi-layer composite plates with the aid of an adhesive and this composite is then deformed. The essence of the disclosure lies particularly in the targeted deformation of vehicle chassis parts, in which with partially applied welding or adhesive connections a desired deformation relationship is achieved, and therein only in second instance is the achievement of a high-as-possible stiffness desired or targeted. Further, also in this case the multi-layer composite plates exhibit the already mentioned disadvantages.

SUMMARY OF THE INVENTION

The invention is thus concerned with the task of providing a multi-layer composite plate suitable for further deforming, as well as a process for the production thereof, whereby in its material characteristics optimal stiffness is achieved, and this in combination with corrosion protection and vibration and sound dampening.

The invention comprises multi-layer composite plates, which include two outer metal sheets as top and base plates, and which are bonded by an intermediate deformable connecting material. Therein the top and base plates are preferably bonded to the connecting material by means of a foaming adhesive, which fills any voids remaining in the composite. The intermediate connecting material is preferably comprised of an expanded metal lattice or mesh or grate, a wire matrix, or a web plate. It could however also be built up of multiple layers of expanded metal lattice, wire mesh, and web plate with intermediate sheets of adhesive transmissive or adhesive non-transmissive materials.

The voids remaining in the composite are completely or partially filled by the foaming adhesive.

The process for production of multi-layer composite plates includes the step of introducing adhesive in between the lamina or plies to be adhered, and then subjecting the adhesive to a thermal treatment. The adhesive between the plies or layers may be in the form of a foil intermediate layer or in liquid form.

By the thermal treatment, the adhesive is completely or partially hardened. In the case of a partially hardened adhesive the adhesive is subjected to further thermal treatment and completely hardened only after the step of deformation of the multi-layer composite plate.

A particular advantage of the invention is comprised in the excellent deformability of the multi-layer composite structure. Within the workpiece the flowing tension transition insures supplemental advantageous material characteristics of the highly stiff structure formed by the deformation in conditions of use. In addition to this, due to the coverage of the internal metal surfaces by the foamed adhesive, an effective protection against corrosion results. A further advantage results from an improvement in the vibration and sound dampening characteristics and with respect to the thermal insulation.

BRIEF DESCRIPTION OF THE DRAWINGS

In the following the invention will be described in greater detail on the basis of advantageous embodiments with reference to the schematic drawings provided in the figures. There is shown.

DETAILED DESCRIPTION OF THE INVENTION

Figure 1:
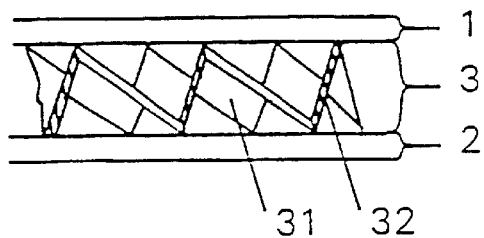
FIG. 1A basic construction of the multi-layer composite plate with expanded metal connecting material, FIG. 1B construction of the expanded metal connecting material, FIG. 2 force-indentation or ductility diagram of composite sheets with hardened adhesive in comparison to solid sheets of similar sheet strength, FIG. 3A representation of the flowing tension transition due to employment of foaming adhesives, FIG. 3B representation of tension transition without foaming.
Figure 1:
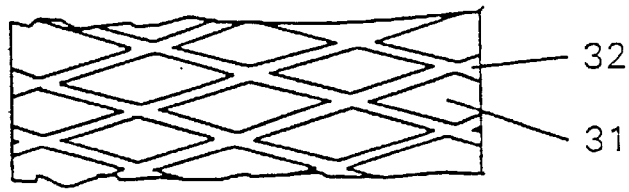

In a first embodiment according to FIG. 1, an expanded metal mesh 32 is employed as connecting material between the top and base sheets. The expanded metal mesh 32 is produced from metal sheets or bands, wherein the sheet is cut in staggered or off-set manner and simultaneously drawn apart and is thereby stretch-deformed to form a grate-shaped mesh. This manufacturing process, which is widely employed in many fields, takes place in a single process step without loss of material. A preferred embodiment is concerned therewith, that in comparison to other materials employed as intermediate materials such as honeycomb or cellular, web or lattice structure, this material is inexpensive to manufacture and widely available. In addition to this, due to the broad selectability of materials (for example automobile body steel, stainless steel, aluminum alloys) as well as the wide selectability of grate geometry (mesh width, web height) the necessary variability of the material for broad utilization as intermediate material is made possible. The variation of the geometry additionally has an important influence on the characteristics of the composite structure and in particular the deformability thereof.

A further essential component of the multi-layer composite plates, which determines the deformability characteristic, is the adhesive. In these structures the joining of the top sheet 1, the connecting material 3 as well as the intermediate plies or layers, and the base sheet 2 is carried out with a foamable adhesive. These include, besides pasty adhesives which foam during thermal hardening, in particular also foil adhesive materials, which can be applied very uniformly or evenly and accordingly during thermal setting also foam evenly. As a result of the foamed adhesive the deformability range of the composite structure is increased in the manner, that the multi-layer composite plate can be subjected to a hardening even subsequent to the deformation process.

Figure 2:
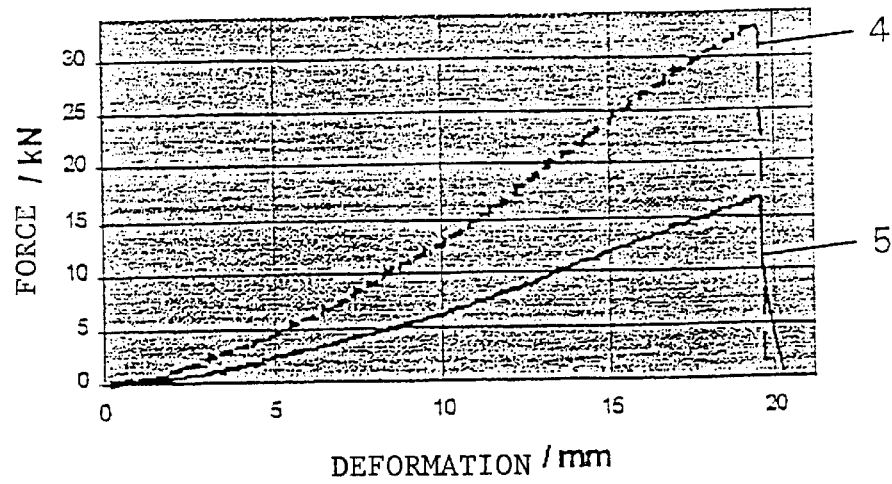

In FIG. 2 there is shown for exemplary purposes a force-denting or dimpling or ductility diagram of the deformation range of a multi-layer composite plate comprised of hardened adhesive 4 in comparison to solid sheets of the same strength 5. The diagram shows in the ductility relationship along the abscissa, that the deformability of the composite is identical with the deformability of the corresponding solid sheet of the same strength. However, thereby there results a highly stiff structure in the deformed condition of use.

Figure 3:
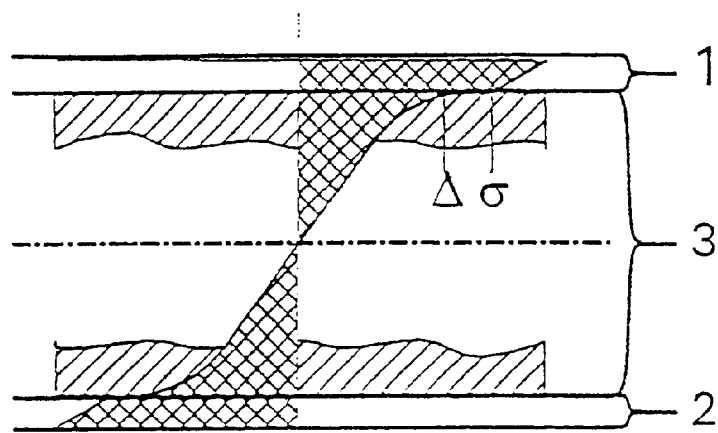
Figure 3:
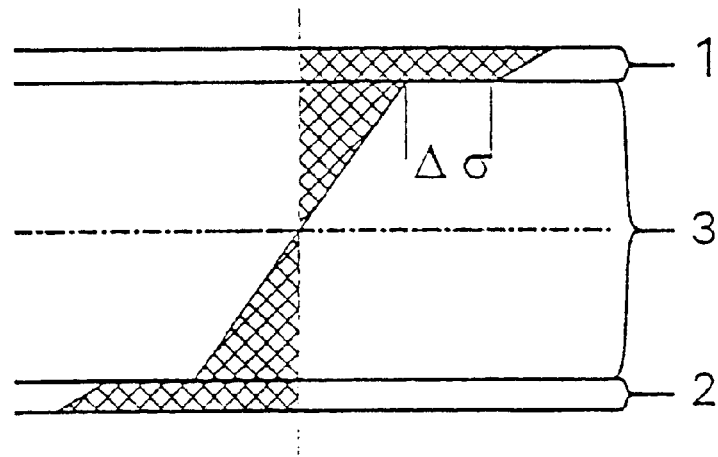

During foaming the adhesive substantially fills the voids remaining in the composite structure and forms therewith a supplemental anchoring layer in which a load on the multi-layer composite plate leads to a flowing tension transition and in accordance therewith results in a higher load capacity. This supplemental advantageous characteristic of the material of this composite structure, which cannot be achieved using other joining techniques which comprise the state of the art, as shown in FIG. 3B, is illustrated in FIG. 3A. FIG. 3A shows, with the workpiece under stress, the mechanism of the distribution of the flowing stress or tension transition in the transition areas from the joining material 3 and top sheet 1 or base sheet 2 towards the workpiece outer side. Besides this, there results an important supplemental benefit, in that by the gluing of corrosion susceptible materials, the foaming adhesive assumes a corrosion protection function. The covering of the inner side of top sheet 1 and base sheet 2 by the adhesive mass and the full surface engulfing of the expanded metal mesh 32 prevents the corrosion of the composite structure. This is of particular significance, since the finished composite structure includes voids 31, which are not protectable by any practical corrosion protection measures such as for example zinc plating or painting. Herein it is not essential that the voids 31 are completely filled by the foam, but rather only that the internal free surfaces are completely covered.

In a further embodiment, the connecting material 3 is a multi-layer sequence of expanded metal mesh, wire grate, web plate in combination with adhesive transmissive or untransmissive intermediate plies. The intermediate plies are designed taking into consideration special deformation characteristics. Herein the transmissive and non-transmissive intermediate plies serve the function of directing or targeting the foaming adhesive within not accessible hollow spaces for a supplemental functionality.

What is claimed is:

1. Multi-layer composite plates, which are comprised of two external metal sheets as top plate (1) and base plate (2), which are connected via an intermediate deformable connecting material (3), wherein the top plate (1) and base plate (2) are joined to the connecting material by means of foam adhesive filling in voids (31) in the composite, and wherein the intermediate connecting material (3) is comprised of an expanded metal mesh (32), a wire lattice or a web plate.

2. Multi-layer composite plates according to claim 1, wherein the intermediate connecting material (3) is comprised of a multi-layer sequence selected from expanded metal mesh, wire lattice, web plate, and adhesive transmissive or non-transmissive intermediate sheets.

3. Multi-layer composite plates according to claim 1, wherein said plates are mechanically deformed.

4. Multi-layer composite plates according to claim 3, wherein said plates are automobile body panels.

5. Process for production of multi-layer composite plates, comprising providing two external metal sheets, one as top plate (1) and one as base plate (2), providing an intermediate deformable connecting material (3) between said top plate and base plate, joining the top plate (1) and base plate (2) to the connecting material by means of foam adhesive filling in voids (31) in the composite, wherein the adhesive is subjected to a thermal treatment.

6. Process for production of multi-layer composite plates according to claim 5, wherein the adhesive is provided between the plates in the form of a foil intermediate layer or in liquid form.

7. Process for production of multi-layer composite plates according to claim 5, wherein said thermal treatment results in the partial hardening of the adhesive.

8. Process for production of multi-layer composite plates according to claim 5, wherein the thermal treatment results in the complete hardening of the adhesive, and further comprising deforming of said composite plates subsequent to said complete hardening of said adhesive.

9. Process for production of multi-layer composite plates comprising:

providing two external metal sheets, one as top plate (1) and one as base plate (2), providing an intermediate deformable connecting material (3) between said top plate and base plate, joining the top plate (1) and base plate (2) to the connecting material by means of foam adhesive capable of filling in the voids (31) in the composite, wherein the adhesive is subjected to a thermal treatment, wherein said thermal treatment results in the partial hardening of the adhesive, and wherein a deformation process of the multi-layer composite plate is carried out prior to a step of completely hardening the adhesive by thermal treatment.

10. Process according to claim 9, wherein said voids (31) remaining in the composite are completely filled in by the adhesive.

11. Process according to claim 9, wherein said voids (31) remaining in the composite are partially filled in by the adhesive.

12. Process for production of multi-layer composite plates comprising:

providing two external metal sheets, one as top plate (1) and one as base plate (2), providing an intermediate deformable connecting material (3) between said top plate and base plate, joining the top plate (1) and base plate (2) to the connecting material by means of foam adhesive filling in the voids (31) in the composite, wherein the adhesive is subjected to a thermal treatment, and wherein a deformation process of the multi-layer composite plate is carried out prior to a step of completely hardening the adhesive by thermal treatment.

* * * * *